Dec. 19, 1939. A. ILLSCHE Re. 21,304

BUTTON FASTENER

Original Filed Aug. 27, 1936

INVENTOR
Arthur Illsche
BY
Walter H. Humphrey
ATTORNEY

Reissued Dec. 19, 1939 Re. 21,304

UNITED STATES PATENT OFFICE 21,304

BUTTON FASTENER

Arthur Illsche, Rye, N. Y., assignor, by direct and mesne assignments, to Ardon Co., Inc., Wilmington, Del., a corporation of Delaware Original No. 2,075,722, dated March 30, 1937, Serial No. 98,153, August 27, 1936. Application for reissue January 11, 1939, Serial No. 250,455

14 Claims. (Cl. 24—105)

Figure 1:
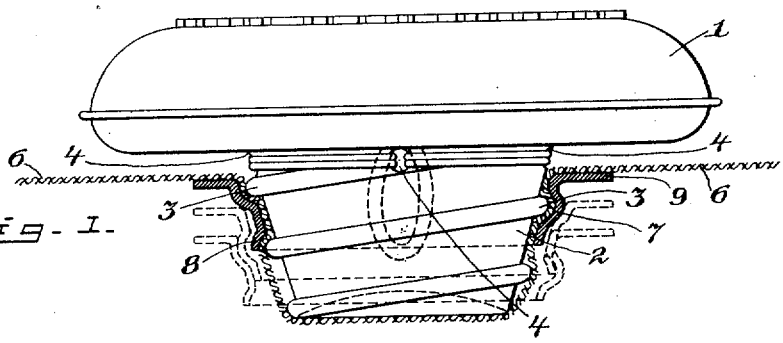

This invention relates to a fastener designed to replace the thread attachment of buttons, ornaments, fancy trimmings and the like, to garments and other fabrics and has for its object to detachably secure such buttons, ornaments, fancy trimmings and the like, so as to permit the ready removal of the same when the garment or other fabric is to be laundered, cleaned, dyed, remodeled, etc.

The present day practice of attaching buttons, ornaments and the like, by sewing them on garments, such as women's fancy wash dresses or evening dresses, for example, creates difficulties for the owners in protecting the buttons, ornaments and the like, when the garments are to be sent to the laundry or to a cleaner or dyer, and the problem of providing the necessary protection becomes a serious one where the buttons, etc., are of special design and not readily replaceable, owing to the danger of damage, breakage or loss.

Women ordinarily meet the situation by cutting off the buttons, ornaments, etc., putting them away in a safe place and sewing them on again when the garment is returned. While this method avoids damage or loss by the laundry or cleaner, it involves a great deal of work and bother for the women owning the garments, and as this is of weekly occurrence for summer washable dresses, blouses, etc., there is a general demand for relief.

To enable women to safe-guard the buttons, ornaments, etc., on their dresses and other garments and at the same time save them the work of cutting them off and sewing them on again, every time they send the garments to a laundry or cleaner, I provide a detachable fastener of such extremely simple form, that any woman, without special skill or ability, can apply them to the buttons and ornaments of her dresses in the time it would ordinarily take to sew such bottons and ornaments on the garments and once applied, the removal or attachment thereafter of the buttons and ornaments becomes a very simple operation.

The fastener consists of two members separably associated in engaging relation by a screw-thread connection between them. The fastener members are designed to be positioned for engagement on opposite sides of the fabric and engagement is effected without puncturing or piercing the fabric, by giving the fastener members relative rotation. The fastener member on the outside of the fabric is suitably adapted for attachment as a fixed and practically permanent and integral part of the button, ornament or like article and while any suitable or well known means may be employed to effect attachment, I have, for purposes of the present case, requiring a disclosure of an operative application of the invention, embodied the same in a form and construction that permits the attachment of the outer fastener member to the button or the like, to be made by sewing one fast to and as a fixed and, to all intentions, permanent part of the other, as would happen if flexible wire thread were used instead of cotton, linen or silk.

The distinguishing feature of the present embodiment of the invention, is that by the simple method of sewing, with which most women are familiar, they can apply the fastener to the buttons and ornaments they now have in use on their dresses and not only make them easily removable for laundering and cleaning but also for repositioning and for interchange with those of other dresses, etc.

In addition to the adaptability of the fastener to all existing types of buttons, ornaments and the like now in use, another important feature of the invention consists in giving one or both fastener members frustro-conical form, which results first, in self-centering action of the members, preliminary to engagement; second, in enabling one member to enter the other in nested relation, to such depth that only a partial turn is required to bring about engagement of the co-operating screw-threads; and third, in regulating engagement between the members according to the thickness of the fabric interposed between the same.

The fastener member that is sewed to the button or ornament is shaped to adapt itself to the underside thread opening formation of all types of the same now in use and may therefore be termed universal in its general adaptability.

This member is a hollow, coned shell, open at the top, closed at the bottom and externally threaded for engagement with an internal thread of the other fastener member. The engagement is effected through the intervening material of the garment and is such that there is no wear and tear on the fabric, as the fastener does not pierce the goods and by causing it to engage a comparatively great number of threads of the fabric, the strain is evenly distributed over a greater area and is, consequently, very much less than is produced where the button or ornament is secured by sewing it directly on the garment.

The button member of the fastener is provided with side and bottom openings, conveniently placed, for the passage of a needle and thread back and forth through the same which, at the same time, passes through the thread openings of the button or ornament and so secures the two together ready for instant and continued use for an indefinite period without further attention.

In the accompanying drawing I have illustrated one form of device suitable for carrying my invention into effect but do not wish to be understood as intending to limit myself to the same, as various changes may be made in both the form and details without departing from the spirit and scope of the invention as outlined in the appended claims.

In the drawing—

Fig. 1 is an assembled view, partly in elevation and partly in section of my improved button fastener in use. This view is on an enlarged scale, with details much exaggerated, for clearness of illustration, the full lines indicating the engaging relation between the fastener members when the button is attached to a very thin fabric and the dotted lines indicating the relation of the fastener members as the thickness of the fabric is increased.

Figure 2:
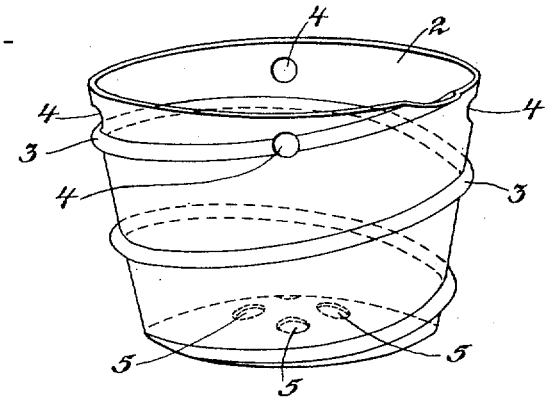

Fig. 2 is a view in perspective of that part of the button fastener which will be hereinafter referred to as the outer member and which is adapted to be sewed to the button, ornament or the like, intended to be detachably secured to the fabric.

Figure 3:
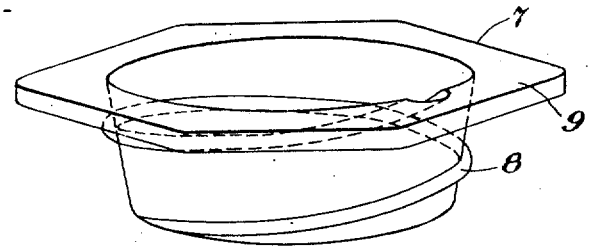
Figure 4:
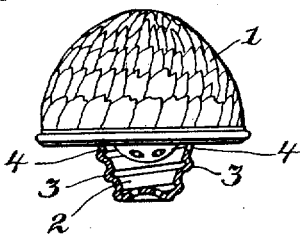
Figure 5:
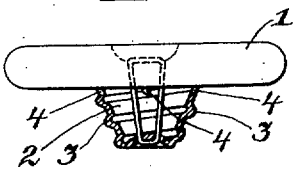

Fig. 3 is a similar view of that part of the fastener, hereinafter referred to as the inner member, which is designed to engage the outer member, with the fabric to which the button, ornament or the like is to be attached, intervening, without puncture, between them, and Figs. 4 and 5 are views in elevation, partly in section, showing the outer member of the fastener attached, by being sewed to buttons having well known thread opening formations, different from that shown in Fig. 1.

Referring now to the drawing, the buttons indicated at 1, in Figs. 1, 4 and 5, each provided with a different but well known thread opening formation, have been selected for convenience of illustration, to make clear that the fastener has general applicability and is not limited to any special construction of the thread opening formation of buttons, ornaments or like articles.

Secured in centered relation to the underside of the button or like article, is shown the outer member 2, of the fastener.

The member 2 is preferably cup-shaped, that is to say it is formed as a flaring cylindrical shell of sheet metal or other material, open at the top, closed at the bottom and provided with an external screw-thread 3 extending throughout its length.

The member 2 is made wide open at the top to adapt itself to the underside central formation of any type of button or ornament now in use, by surrounding and enclosing the same, so as to come to a bearing against the under surface thereof. As the underside central formation of buttons and the like varies considerably, though serving only to carry thread openings, no attempt has been made to illustrate the details, as they are well known in the art.

Near the upper open end of the member 2, and equispaced about the circumference, openings 4, 4, etc., are formed for the passage back and forth of a needle and thread, employed to sew the member to a button or other article to which the fastener is to be applied. These openings are made large enough to come into practical alignment with the thread openings of any button or ornament when the underside formation is such that the thread openings extend horizontally or in a plane parallel with the face of the same.

In the closed bottom of the fastener member 2, which is preferably concaved more or less, additional thread openings 5, 5, etc., are formed to come into practical alignment with the thread openings of the button or the like, when such thread openings extend vertically or in planes at right angles to the face of the same, enabling the needle and thread to be passed back and forth through the two sets of openings to secure the member to the button, ornament or the like, as above described. The shallow chamber formed by the concaved bottom of the member 2, is of sufficient depth to prevent the attaching thread from projecting below the bottom line of the member and forming an objectionable hump.

The inner member 7 of the fastening is shown below or in its position on the underside of the fabric 6 and consists of a cylindrical shell of sheet metal or other suitable material, open at the top and bottom and provided with an internal thread 8 for engagement with the thread of the outer member 2, serving, in effect, as a screw-threaded nut.

The inner member is flared to correspond to the flare of the outer member and is preferably made somewhat less than half the length of the outer member, so that when engaging the latter, with the fabric of the garment intervening, which may be thin, medium or thick, the inner member may be screwed up to a point where it will come into close clamping relation with the outer member to secure the button or the like to the garment, as shown in Fig. 1.

As a result of the frustro-conical form and relative proportions given the members of the fastening, when the inner member is screwed home on the outer member, either with or without thin garment material intervening, the inner member comes to the limit of its movement just below the thread apertures in the outer member, leaving ample space under the button, as required, for the additional thickness of the garment material in which the button holes are formed. As will be seen in Fig. 1, this clearance or space under the button increases proportionately, by reason of the flared formation of the fastener members, as the thickness of the garment material or other fabric increases.

The engagement of the fastener members, through the fabric, can ordinarily be accomplished by hand but as turning the same to secure the members against working loose may prove too much of a strain on the fingers, I provide the inner member with an upper flange 9 of hexagonal or other outline and a small skeleton socket wrench may be employed, shaped to fit the flange. Aided by such a wrench, the fastening can be made secure with little or no effort.

In addition to the above described use in removably attaching buttons, ornaments, etc., to garments, the invention, as herein embodied, is adaptable, as will be evident, and without material change or modification, to serve as a fastener for any article it is desired to detachably secure to a fabric serving purposes other than for wearing apparel.

As the many important advantages of the invention as well as the construction and the manner of applying the same for use, will be understood from the foregoing description, further elaboration of the same will not be necessary.

Having described my invention, I claim:

1. A button fastener for attaching a sew-on type of button to a fabric, comprising two members provided with engaging elements cooperating to separably connect the members together, with the fabric interposed without puncture between them, one of the members having openings therein registering with the thread openings of the button, and a button attaching thread passing through the registering openings and securing the button to the last mentioned member.

2. A button fastener for attaching a sew-on type of button to a fabric, comprising two members provided with engaging elements cooperating to separably connect the members together, with the fabric interposed without puncture between them, one of the members being shaped to enclose the underside thread opening formation of the button and having openings therein registering with the thread openings of the button, and a button attaching thread passing through the registering openings and securing the button to the last mentioned member.

3. A button fastener for attaching a sew-on type of button to a fabric, comprising two members separably secured together in engaging relation by a screw-thread connection, with the fabric interposed without puncture between them, one of the members having openings therein registering with the thread openings of the button, and a button attaching thread passing through the registering openings and securing the button to the last mentioned member.

4. A button fastener for attaching a sew-on type of button to a fabric, comprising two members separably connected in engaging relation, with the fabric interposed without puncture between them, one of the members having openings therein registering with the thread openings of the button, and a button attaching thread passing through the registering openings and securing the button to the last mentioned member, the other member being in the form of a nut screw-threaded for engagement with the button-carrying member and provided with a wrench-shaped flange.

5. A button fastener for attaching a sew-on type of button to a fabric, comprising two members provided with engaging elements cooperating to separably connect the members together, with the fabric interposed without puncture between them, one of the members being shaped and socketed to come to a bearing against the underside of the button and enclose the thread opening formation thereof and having openings therein registering with the thread openings of the button, and a button attaching thread passing through the registering openings and securing the button to the last mentioned member.

6. A button fastener for attaching a sew-on type of button to a fabric, comprising two members provided with engaging elements cooperating to separably connect the members together, with the fabric interposed without puncture between them, one of the members being cup-shaped to receive and enclose the underside thread opening formation of the button and having side and bottom openings therein, certain of which register with the thread openings of the button, and a button attaching thread passing through the registering openings and securing the button to the last mentioned member.

7. A button fastener for attaching a sew-on type of button to a fabric, comprising two members of substantially frustro-conical form, separably connected together in engaging relation, with the fabric interposed without puncture between them, one of the members having openings therein registering with the thread openings of the button, and a button attaching thread passing through the registering openings and securing the button to the last mentioned member.

8. A button fastener for attaching a sew-on type of button to a fabric, comprising two members of tapered form and of different length, separably associated in engaging relation by a screw-thread connection, with the fabric interposed without puncture between them, one of the members having openings therein registering with the thread openings of the button, and a button attaching thread passing through the registering openings and securing the button to the last mentioned member.

9. A button fastener for attaching a sew-on type of button to a fabric, comprising two members of tapered form and of different length, the longer member having a concaved bottom and the shorter member a wrench-shaped top, the said members being separably associated in engaging relation by a screw-thread connection, with the fabric interposed without puncture between them, the longer member having openings therein registering with the thread openings of the button, and a button attaching thread passing through the registering openings and securing the button to the last mentioned member.

10. A button fastener for attaching a sew-on type of button to a fabric, comprising two shell-like members of tapered form and of different length, the longer member having a concaved bottom and open top and the shorter member a wrench-shaped flanged top; the said members being separably associated in engaging relation by a screw-thread connection, with the fabric interposed without puncture between them, the longer member having side and bottom openings therein, certain of which register with the thread openings of the button, and a button attaching thread passing through the registering openings and securing the button to the last mentioned member.

11. A fastener for detachably securing a button, ornament or the like, comprising two separably engaged counterpart members adapted for use with materials of different thickness to which the fastener is removably attached by engaging the members thereof from opposite sides of the material without puncturing the same, one of the fastener members being of conical form terminating in a blunt end and threaded for engagement with its counterpart member, said counterpart member being relatively shallow and open at its smaller end and having a complementary internally threaded portion to engage the thread of the other member to a depth determined by the thickness of the material interposed between the members.

12. A fastener, as defined in claim 11, in which the counterpart member is of open ring form to permit the other member to pass partially through the same to a depth required to accommodate materials of different thicknesses interposed between the members.

13. A fastener, as defined in claim 11, in which the conical fastener members differ in length and the shorter member is open at both ends to permit the longer member to pass partially through the same to a depth required to accommodate materials of different thickness interposed between the members.

14. A fastener, as defined in claim 11, together with means for securing the conical fastener member to a button, ornament or the like as a substantially integral part thereof.

ARTHUR ILLSCHE.